(12) United States Patent
Mueller

(10) Patent No.: US 6,286,546 B1
(45) Date of Patent: Sep. 11, 2001

(54) DISPOSABLE SEAL SYSTEM WITH INTEGRAL BUFFER

(75) Inventor: Peter Michael Mueller, Suwanee, GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/426,491

(22) Filed: Oct. 26, 1999

(51) Int. Cl.$^7$ ..................................................... F16L 17/10
(52) U.S. Cl. ............................ 137/580; 137/343; 137/560
(58) Field of Search .................................... 137/580, 343, 137/560

(56) References Cited

U.S. PATENT DOCUMENTS

| | | | |
|---|---|---|---|
| 2,308,137 | * | 1/1943 | White . |
| 4,217,027 | * | 8/1980 | MacChesney et al. ............... 385/123 |
| 4,790,699 | * | 12/1988 | Ringel ................................... 409/231 |
| 5,439,029 | * | 8/1995 | Becker .................................. 137/580 |

FOREIGN PATENT DOCUMENTS

781474 * 11/1980 (SU) ...................................... 137/580

* cited by examiner

Primary Examiner—A. Michael Chambers
(74) Attorney, Agent, or Firm—Thomas, Kayden, Horstemeyer & Risley, LLP

(57) ABSTRACT

A dual seal system for retrofitting existing vapor deposition apparatus for starter tubes has a first tubular member which surrounds the chemical vapor delivery tube and forms a channel therewith for passage of starter tube gases to a stationary seal coupling member which, in turn, is connected to monitoring apparatus. A second tubular member surrounds the first tubular member and forms a passage therewith extending from behind a seal assembly in the starter tube to a bore in the coupling member connected to a buffer gas supply. The second tubular member also forms a third passageway with the interior wall of the arbor driving the starter tube and is held spaced therefrom by a perforated support member. The third passageway extends from a region behind the sealing system to a sealed buffer chamber in the coupling member, which is connected to a low pressure of vacuum source and to a pressure monitoring member.

25 Claims, 8 Drawing Sheets

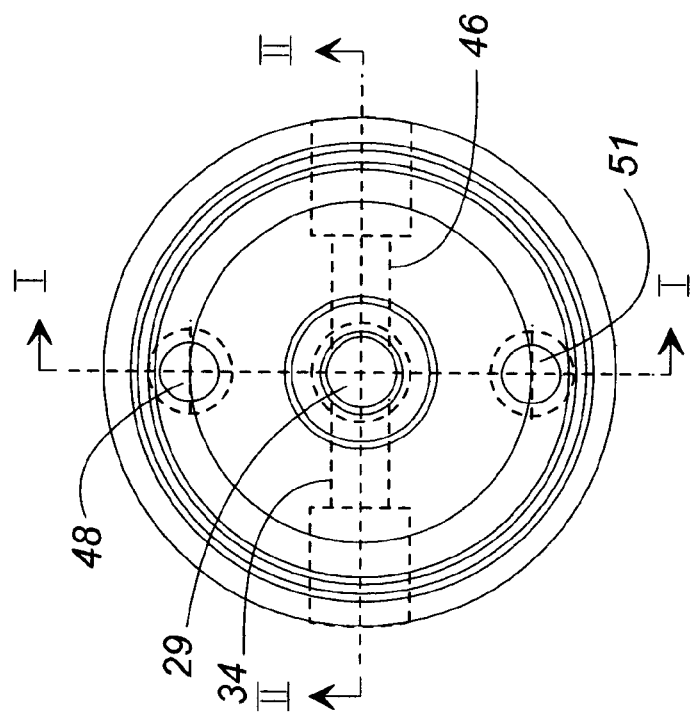
FIG. 6B
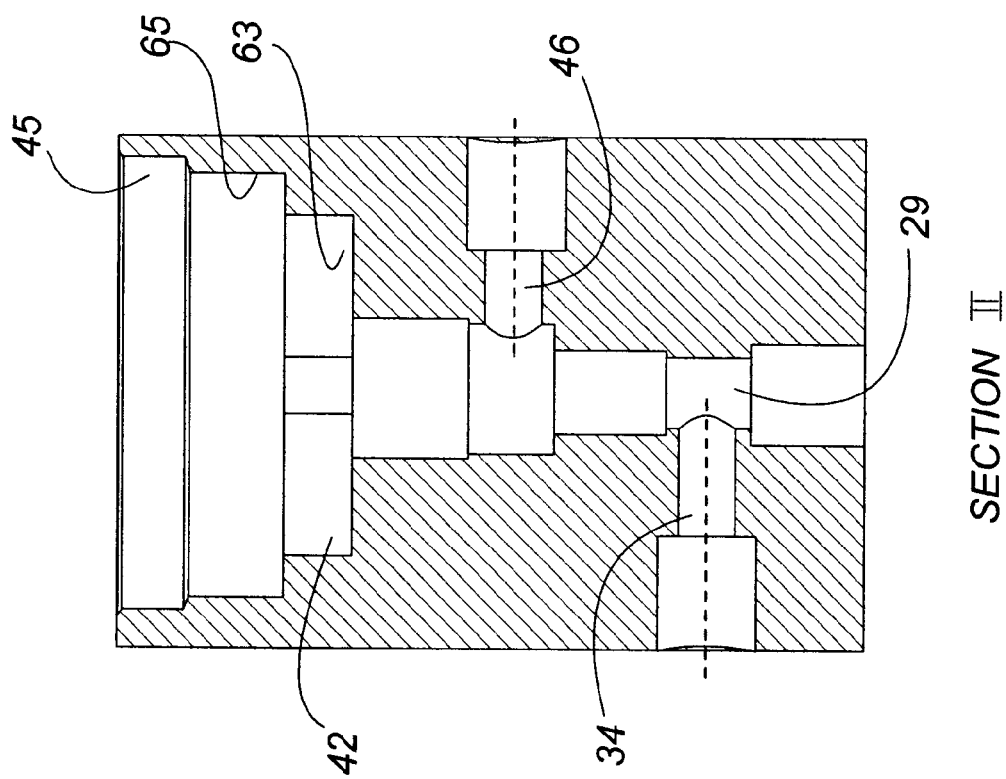
FIG. 6C  SECTION II

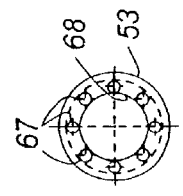
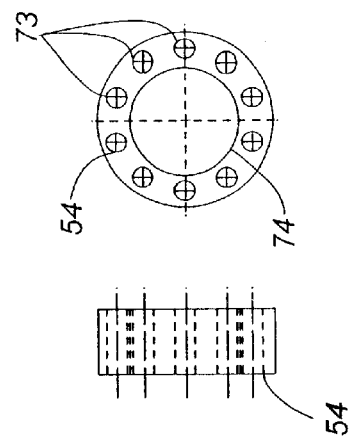
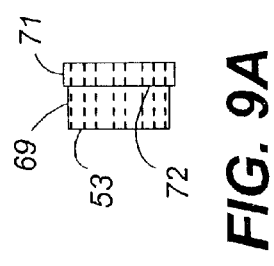
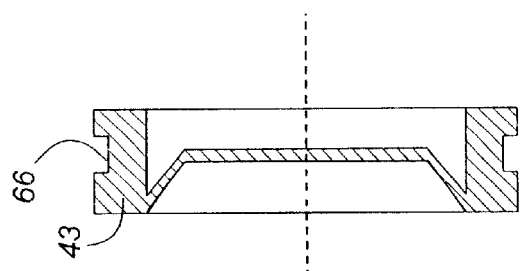
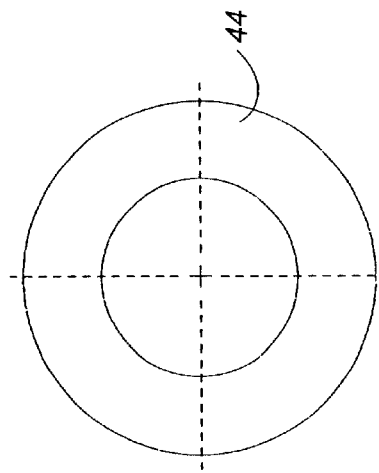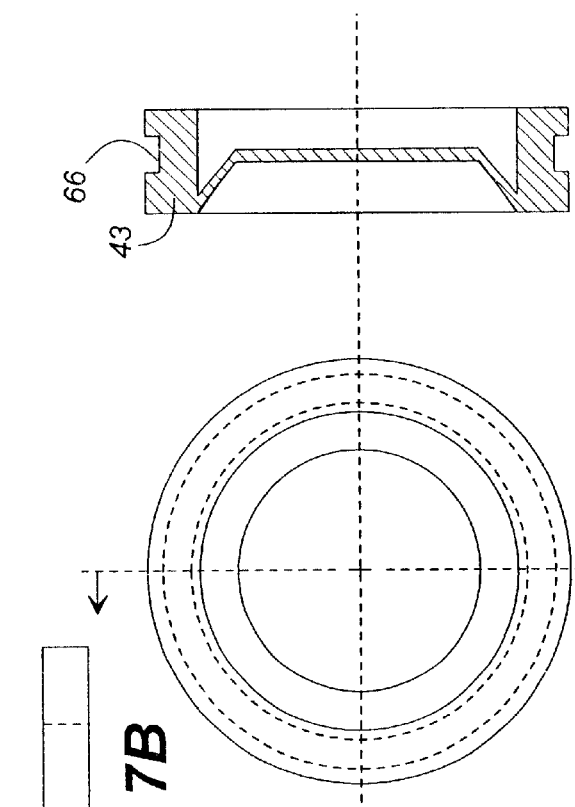

US 6,286,546 B1

DISPOSABLE SEAL SYSTEM WITH INTEGRAL BUFFER

RELATED APPLICATIONS

This invention is related to those shown in U.S. patent applications Ser. No. 09/383,716 of P. M. Mueller and 09/383,780 filed on Aug. 26, 1999, the disclosures of which are incorporated herein by reference, and of U.S. patent application Ser. No. 09/426,968 filed concurrently herewith the disclosure of which is incorporated herein by reference.

FIELD OF THE INVENTION

This invention relates to a sealing apparatus for chemical delivery systems and, more particularly, to the process of introducing materials into the interior of rotating tubular members, wherein the apparatus forms a buffer zone for controlling leakage.

BACKGROUND OF THE INVENTION

The following discussion deals with starter tubes and sealing arrangements for optical fiber pre-forms, but it is to be understood that principles of the present invention are applicable to other, different applications involving, generally, chemical delivery systems wherein the chemicals are in gaseous or vapor form.

Optical fiber of the type used to carry optical signals is fabricated typically by heating and drawing a portion of an optical pre-form comprising a refractive core surrounded by a protective glass cladding. Presently, there are several known processes for fabricating pre-forms. The modified chemical vapor deposition (MCVD) process, which is described in U.S. Pat. No. 4,217,027 issued in the names of J. B. MacChesney et al. on Aug. 12, 1980 and assigned to Bell Telephone Laboratories, Inc. has been found to be one of the most useful because the process enables large scale production of pre-forms which yield very low loss optical fiber.

During the fabrication of pre-forms by the MCVD process, reactant-containing gases, such as $SiCL_4$ are passed through a rotating substrate tube which is made of silica glass. A torch heats the tube from the outside as the precursor gases are passed therethrough, causing deposition of submicron-sized glass particles on the inside surface of the tube. The torch is moved along the longitudinal axis of the tube in a plurality of passes to build up layer upon layer of glass to provide a pre-form tube. Once a sufficient number of layers have been deposited, the pre-form tube is then heated to cause it to be collapsed to yield a pre-form or pre-form rod as it is often called. The delivery system of the reactant gases to the starter tube interior is generally through a fixed metallic hollow tube connected to the source or sources of the gases. It is necessary that the space between the exterior surface of the delivery tube and the interior surface of the glass starter tube be sealed so that the critical gases do not leak out of the starter tube.

In the current method of manufacture, the apparatus which ensures sealed delivery of the deposition chemicals in the gases is a combination of a rotary union element, a structure for holding and sealing the starter tube, and a secondary face seal assembly for routing of purge gases through the structure. This is a complex apparatus that requires frequent maintenance. Existing systems also have the disadvantage of having inherently larger cavities for the accumulation of dead zones of flow, and a tendency to create particle contamination from the rotary union and face seal system. Inasmuch as the chemical delivery system is stationary, the current means of achieving delivery is via the rotary union, featuring a transition of the chemicals from a stationary pipe to a rotary pipe or to the inside of a supply coupling. The chemicals being delivered are at a pressure greater than atmospheric, and the face seal properties are the only restriction to the release of the chemicals to the atmosphere. The rotary union and secondary face seals generate a large quantity of particles from wear, and contribute to the contamination of the coupling. As the seals wear down, excessive leakage occurs both to the atmosphere and into the product (starter tube), resulting in lost product and requiring system maintenance. The complexity of the components involved requires skilled maintenance being performed using requalification through test of the system. Both material and labor costs are, consequently, high.

Present day techniques and apparatus provide a buffer zone of gas/liquid between the chemical being delivered into the atmosphere. The buffer zone provides for a controlled environment, which may be regulated to pressures higher or lower than the surrounding chemical being delivered and higher/lower than the atmosphere. Selection of this buffer zone pressure and constituent gas/liquid in this zone controls the leakage directions and the leakage constituents across the seals. In a typical buffered sealing system, the buffered volume is achieved most simply by having a single internal seal and a single external seal connected via a housing which is fixed relative to the rotating member to be sealed. The introduction passage and the removal passage are then connected through the housing to the buffer volume.

In Mueller patent application Ser. No. 09/497,042 filed Feb. 2, 2000, the disclosure of which is incorporated herein by reference, there is shown a sealing system that eliminates many drawbacks characteristic of prior art delivery systems, as enumerated in that application, such as, for example, the rotary union, by internally sealing the starter tube by means of a self tightening seal and mounting arrangement therefor. The basis of such the arrangement of that application requires a constant rotational capability of the mounting hub for the self tightening feature, which conflicts with the need for fixed connections to the buffer zone of the introduction and removal lines. Inasmuch as supply lines cannot be connected directly to the components of the Mueller arrangement, the advantages to be gained through the use of disposable, self-tightening seals would appear to be unrealizable.

In Mueller patent application Ser. No. 09/383,786 filed Aug. 8, 1999 now U.S. Pat. No. 6,210,487 issued Apr. 3, 2001 there is shown a dual internal seal system which eliminates the aforementioned conflict. The system shown in that application is for use with a stationary chemical supply apparatus including a stationary delivery tube having a first end upon which is mounted a supply coupling having an extension inserted into the starter tube of an optical pre-form starter tube. A primary seal is mounted to the first end of the extension tube and functions to seal the interior of the starter tube from the atmosphere or ambient environment, thus preventing deleterious leakage loss of the chemical vapor introduced therein through the extension tube. A secondary seal, also mounted on the delivery tube, is spaced from the primary seal to form a buffer zone between the two seals. A supply coupling receives oxygen, for example, from a controllable pressure source, and introduces it into the buffer zone between the two seals. The supply coupling also is connected to a vacuum source for exhausting the gas mixture from the buffer zone, thereby creating a continuous gas flow.

As discussed in the aforementioned Mueller application Ser. No. 09/383,780, the mounting means for the seals may take any of a number of forms, however, a preferred arrangement is a threaded end on the insert and interior threads in the seal nut. Also as explained in the Mueller application, the direction of the threads, i.e., left hand or right hand, should be the same as the direction of rotation of the starter tube in order to apply a tightening torque to the seal and to the seal nut. The same constraint applies to other types of fastening or mountings which require a twisting or turning action, such as, for example, bayonet mounts. The primary and secondary conical seals are longitudinally spaced and, in use, form a buffer zone that is sealed by the primary seal from the starter tube interior, and, by the secondary seal from the atmosphere.

In use, the oxygen or other buffer gas or liquid is introduced under regulated pressure into the supply coupling housing and distributed by the first group of channels to the buffer zone. The buffer zone gases, which may include some leakage from the starter tube, are exhausted through the second group of channels to the vacuum apparatus coupling. Thus, there is a constant circulation of gaseous/liquid material through the buffer zone which, as discussed hereinbefore, makes possible a controlled environment, control over leakage, cooling of the apparatus, and removal of contaminants or other unwanted materials. These desiderata are realized in a relatively simple apparatus having replaceable seals without the necessity of disturbing or piercing the seals.

The just described dual sealed buffer zone arrangement has been found to yield excellent results. However, it represents a new system in which several components used in formation of preforms are modified to accommodate the new components. Inasmuch as there exist, today, numerous gas delivery systems already in place, it would be highly desirable to retrofit them with minimum modification, to produce a dual sealed buffer zone system based upon principles described in the foregoing.

SUMMARY OF THE INVENTION

The present invention is a dual seal system which makes use of disposable seals of the type shown and described in the aforementioned Mueller application Ser. No. 09/383,716 to create a buffer zone and a pressure monitoring system for use with existing MCVD apparatus. Such apparatus generally includes a rotary union from which a rotating gas delivery tube extends into the pre-form tube being treated. The pre-form tube itself is mounted in a rotating arbor for rotation at a predetermined speed. After sufficient depositions have been made on the interior wall of the tube, the tube is collapsed to form the glass rod from which the fiber is drawn.

In accordance with the present invention, the rotary union, which can be a source of leaks, is replaced by a stationary seal coupling member from which extends a first tubular member which surrounds the chemical delivery tube, which is also stationary and extends along a major portion of its length to a distal end upon which a disposable seal is mounted. The inside diameter of the first tubular member is greater than the outside diameter of the gas delivery tube thereby creating a first passageway which extends from the distal end of the first tubular member to the seal coupling member, where it communicates through a passage in the coupling member to a cap, to which is mounted a pressure monitoring gauge. A second tubular member surrounds the first tubular member and extends from the coupling member to a distal end which is behind the seal. The inside diameter of the second tubular member is greater than the outside diameter of the first tubular member so that a second passageway is formed therebetween which extends from the distal end of the second tubular member to the seal coupling member, where it communicates with a buffer gas supply through a passage in the coupling member. The second tubular member is prevented from possible flailing or misalignment by first and second perforated support members or washers, located adjacent the distal end.

The inside diameter of the arbor is greater than the outside diameter of the second tubular member, thereby forming a passageway between the two which is sealed from the interior of the starter tube and which extends into a buffer region which is sealed from atmosphere by a disposable seal between the exterior of the arbor and an interior wall of the coupling member. Thus, there exists a buffer zone which extends from the first seal, within the starter tube, to the second seal within the coupling member. The buffer zone region within the coupling member is connected through a first passageway to a lower pressure or vacuum source and through a second passage to a pressure gauge for measuring the pressure within the buffer zone, or a single passage for both can be used and the second passage plugged.

In operation, the buffer gas, e.g., oxygen, is introduced under regulated pressure into the coupling member passage connected to the second passageway, that is the passageway between the first and second tubular members, down which it flows through the first and second perforated support members and back into the buffer region within the coupling member, where its pressure is monitored and adjusted by means of the vacuum source and the pressurized buffer gas supply. The seals, as is the case in the aforementioned Mueller applications, are mounted so as to be self tightening. That is, their tightening direction of rotation is the same as the direction of rotation of the arbor, and, hence, the starter tube.

In accordance with the principles set out in the U.S. patent application Ser. No. 09/426,968 filed concurrently herewith and incorporated herein by reference, the first passageway, that is, the passageway between the delivery tube and the first tubular member communicates with the interior of the starter tube and affords a means of monitoring and adjusting the gas pressure during the tube collapsing operation. The amount of gas drawn off for monitoring is small and has little effect on the overall deposition operation.

The general process for collapsing the tube includes reducing the rate of traverse of the heat source creating the hot zone in the tube, and thereby increasing the temperature of the hot zone, until the tube commences to collapse, being in a semi-molten state. Collapsing is generally commenced at the end of the starter tube remote from the distal end of the gas delivery tube. The operation may be, and usually is, commenced while gas is still being introduced into the starter tube, but final collapse is preferably under low flow conditions. As the starter tube collapses, its interior volume is decreased, hence the gas pressure within the remaining volume increases. Too great an increase in the pressure can cause a ballooning of the tube of the extent that it is no longer of uniform diameter. However, in accordance with the present invention, and as taught in the aforementioned Mueller application Ser. No. 09/426,968, the interior of the starter tube is in communication with the seal coupling member and the pressure monitoring gauge, which gives a continuous reading of the pressure within the starter tube. This gauge can be used to control the pressure by controlling the gas delivery to the interior of the starter tube or by venting the excess gas to the outside of the starter tube.

The pressure in the buffer zone is likewise controllable, in a similar manner, by monitor gauge and by means of the low pressure connection to the coupling member passage to the buffer zone.

The present invention, as described in the foregoing, comprises an apparatus which may be added to an existing apparatus to create a buffer zone and a starter tube pressure monitoring system. The only element of an existing system being modified that is changed is the elimination of the rotary union, which allows the gas delivery tube to be non-rotating when used with the disposable seals in the present invention. The starter tube pressure monitoring arrangement also makes it possible to correct certain existing defects in the starter tube, such as diameter irregularities.

The principles and features the present invention will be readily apparent from the following detailed description, read in conjunction with the accompanying drawings.

DESCRIPTION OF THE DRAWINGS

FIG. 6B is a rear elevation view of the member of FIG. 6A;

FIG. 6C is a cross-sectional view along the line II—II of FIG. 6B;

FIGS. 7A and 7B are two views of the retaining member of FIG. 5;

FIGS. 8A and 8B are two views of the sealing member of FIG. 5;

FIGS. 9A and 9B are two views of the first perforated support member of FIG. 3; and FIGS. 10A and 10B are two views of the second perforated support member of FIG. 3.

DETAILED DESCRIPTION

In the fabrication of the pre-form for drawing clad glass fibers, generally, gas phase precursor reactants together with oxygen are introduced into a glass tube, i.e., a starter tube, in a constantly moving stream. The tube and its contents are heated to a homogenous reaction temperature within a moving hot zone produced by a moving heating element which continuously traverses the outside surface of the rotating tube. Homogeneously produced glass particles, commonly called "soot" collect on the tube walls, and are fused into a continuous layer within the moving hot zone. In the modified vapor deposition (MCVD) process shown and described in the aforementioned MacChesney et al U.S. Pat. No. 4,217,027, the tube is continuously rotated about its longitudinal axis.

Figure 1:
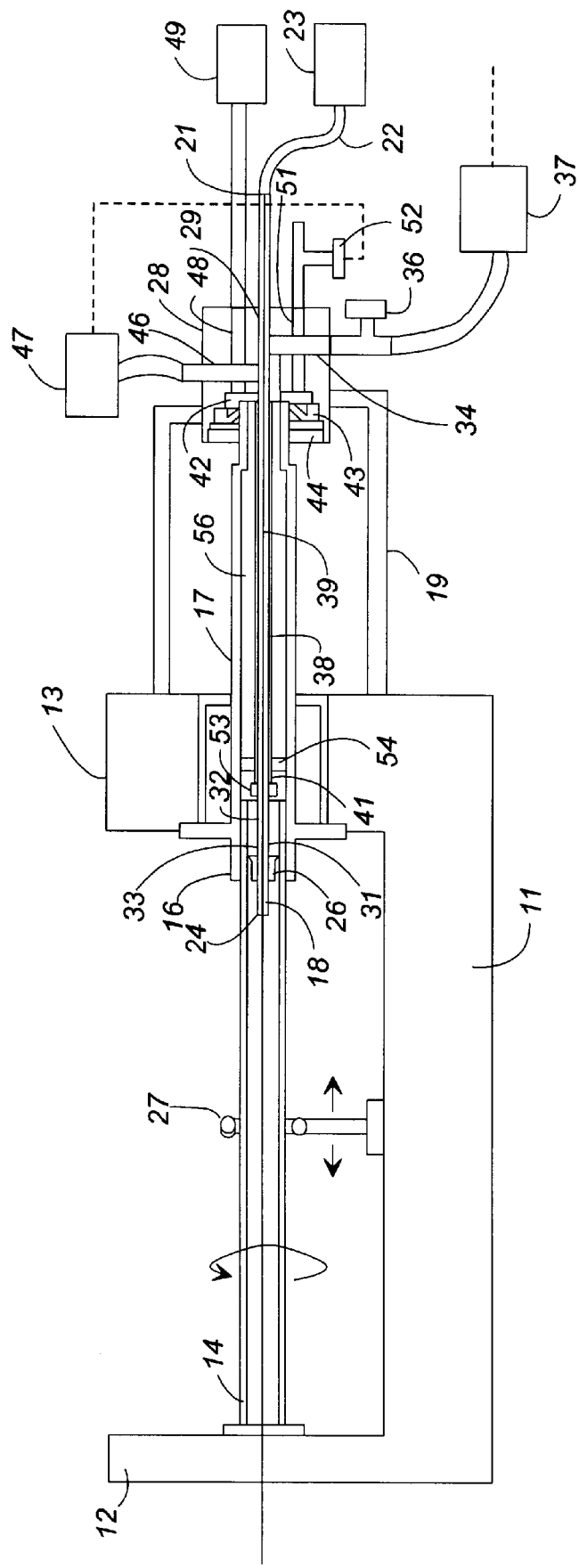
FIG. 1 is a diagrammatic view of the apparatus for introducing gaseous elements into a starter tube as retrofitted with the apparatus of the present invention.

FIG. 1 is a diagrammatic view of the apparatus for preparing preforms as just discussed, and showing the sealing arrangement of the present invention. A lathe 11 has, axially disposed between a tailstock 12 and a headstock 13, a starter tube 14. Tube 14 is mounted in an arbor 16 having a cylindrical or hollow shaft 17 and which is driven by means not shown, but generally contained within the headstock, to rotate tube 14 in the direction of the arrow. It is to be understood that rotation may be clockwise or counter-clockwise. For the following discussion, it will be assumed that the direction of rotation is counter-clockwise as viewed from tailstock 12 toward headstock 13. Within the arbor shaft 17 is a stationary delivery tube 18, the stationary mounting arrangement for the tube being shown diagrammatically as mounting element 19, which may take any of a number of forms. Delivery tube 18 is shown with a protruding end 21 which is coupled by a conduit 22 to a source 23 of the gaseous materials. Tube 18 intrudes into the end of starter tube 14 and has, at its intruding end 24 the sealing arrangement or seal 26 of the invention, to be discussed more fully hereinafter. Seal 26 is, in accordance with the disclosures of the aforementioned Mueller patent applications, self tightening, i.e., as tube 14 rotates, it tightens the sealing arrangement 26 to insure maintenance of a seal with tube 14 that prevents the gases in tube 14 from leaking out. A heat or flame source 27 is movably mounted within lathe 11 for back-and-forth traversal of the length of tube 14, as discussed hereinbefore, and as indicated by the arrows.

In accordance with the invention, a stationary seal coupling member 28, the details of which will be clearly set forth hereinafter is shown mounted to mounting member 19 by way of illustration only inasmuch as any of a number of mounting arrangements may be used, so long as the central bore 29 of member 28 is properly aligned with the axis of tube 18, allowing it to pass through member 28 without interference. Extending from member 28 is a first tubular member 31, which surrounds delivery tube 18 and, having an inside diameter greater than the outside diameter of tube 18, creates a first passageway 32 which extends from the distal end 33 of tubular member 31 to, and into, member 28. Subsequent figures show this arrangement more clearly than FIG. 1, which is intended to be a diagram only. Distal end 33 of member 31 terminates in sealing member 26 which seals the interior of starter tube 14 from the exterior surroundings, in the manner disclosed and discussed in the aforementioned Mueller applications. However, as will be more clearly shown hereinafter, the interior of starter tube 14 does communicate, through passage 32, with the interior of member 28, and with a passage 34 therein, which is connected to a pressure gauge 36 and a control member 37, which may be a low-pressure source for reducing the pressure in tube 14, and which, also, may control gaseous source 23. In this way, the pressure within tube 14 is continuously monitored and maintained at proper levels. Such monitoring and control is especially useful during starter tube collapse, as explained in the foregoing discussion.

Surrounding the first tubular member 31 is a second tubular member 38 which, having a larger inside diameter than the outside diameter of tubular member 31, creates a second passageway 39 which extends through the hollow shaft 17 of arbor 16 from a region adjacent seal 26 at the distal end 41 of member 38 to the interior of member 28 and into a buffer gas chamber 42. Chamber 42 is sealed to the exterior of arbor 17 by means of seal 43 which is retained in member 28 by means of a retaining member 44. Second passageway 39 communicates with a bore 46 in member 28 which is, in turn, connected to a source 47 of buffer gas, such as oxygen. Chamber 42 is connected through a bore 48 in member 28 to a low pressure source 49 and, through a bore 51 to a pressure gauge 52 for monitoring and controlling the buffer gas pressure in the buffer zone. The buffer zone extends through the second passageway 39 to the distal end 41 of tubular member 38, which terminates in a perforated support member 53, which allows the buffer gas to enter the region behind seal 26. A second perforated support member 54 allows the buffer bas to return to chamber 42 through a third passageway 56 between the second tubular member 38 and the interior wall of arbor 17. Thus, the buffer zone extends from the rear of seal 26 to the rear of seal 43.

It can be seen from the foregoing that both a buffer zone and a starter tube pressure monitoring arrangement are created by the addition of the several elements discussed to an existing vapor deposition apparatus without substantial modification thereof except for elimination of the rotary union.

Figure 2:
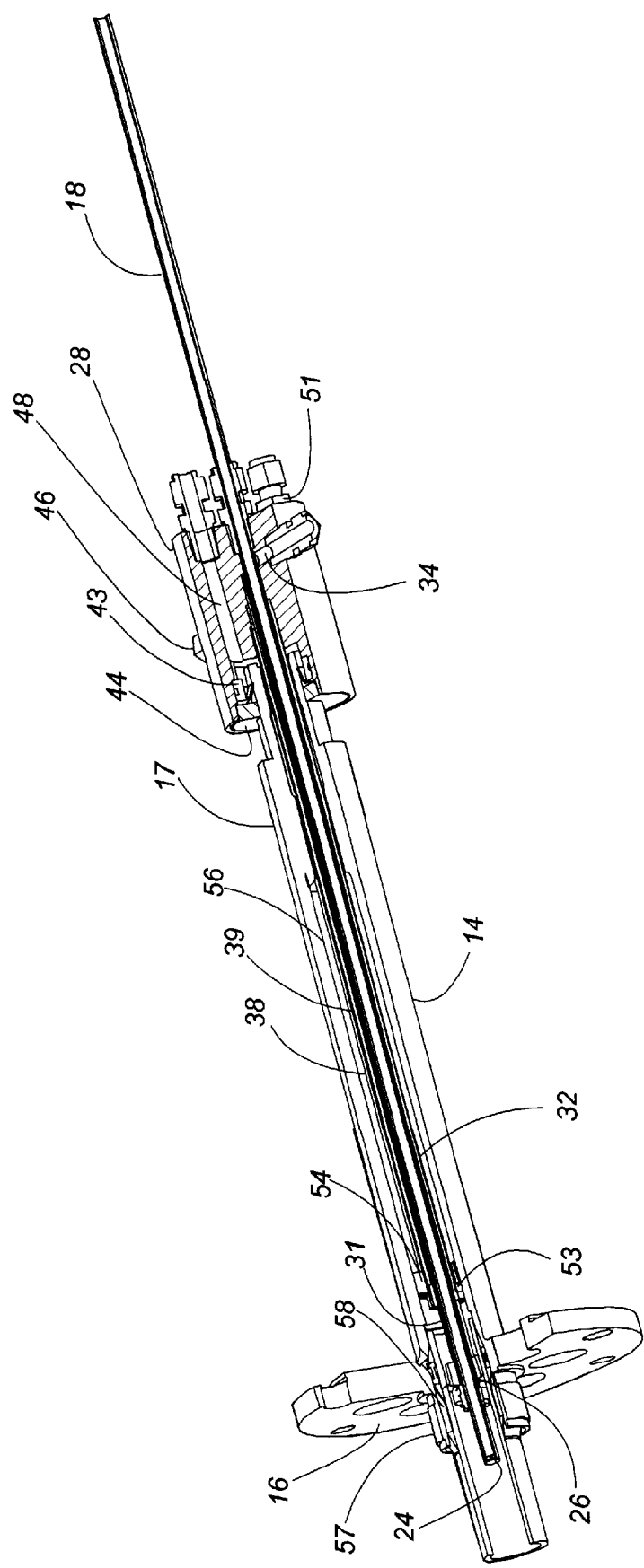
FIG. 2 is a perspective, partially sectional view of the component parts of the present invention.

FIG. 2 is a perspective, partially sectional view of these elements which shows somewhat more clearly the arrangement thereof. It can be seen that arbor 16 is mounted on the outer surface of starter tube 14 by means of a nut 57 and associated sealing members 58. Bores 46 and 51 are not shown, but the connections thereto are, hence, for simplicity, the connections are designated by their related bores 6 and 61.

Figure 3:
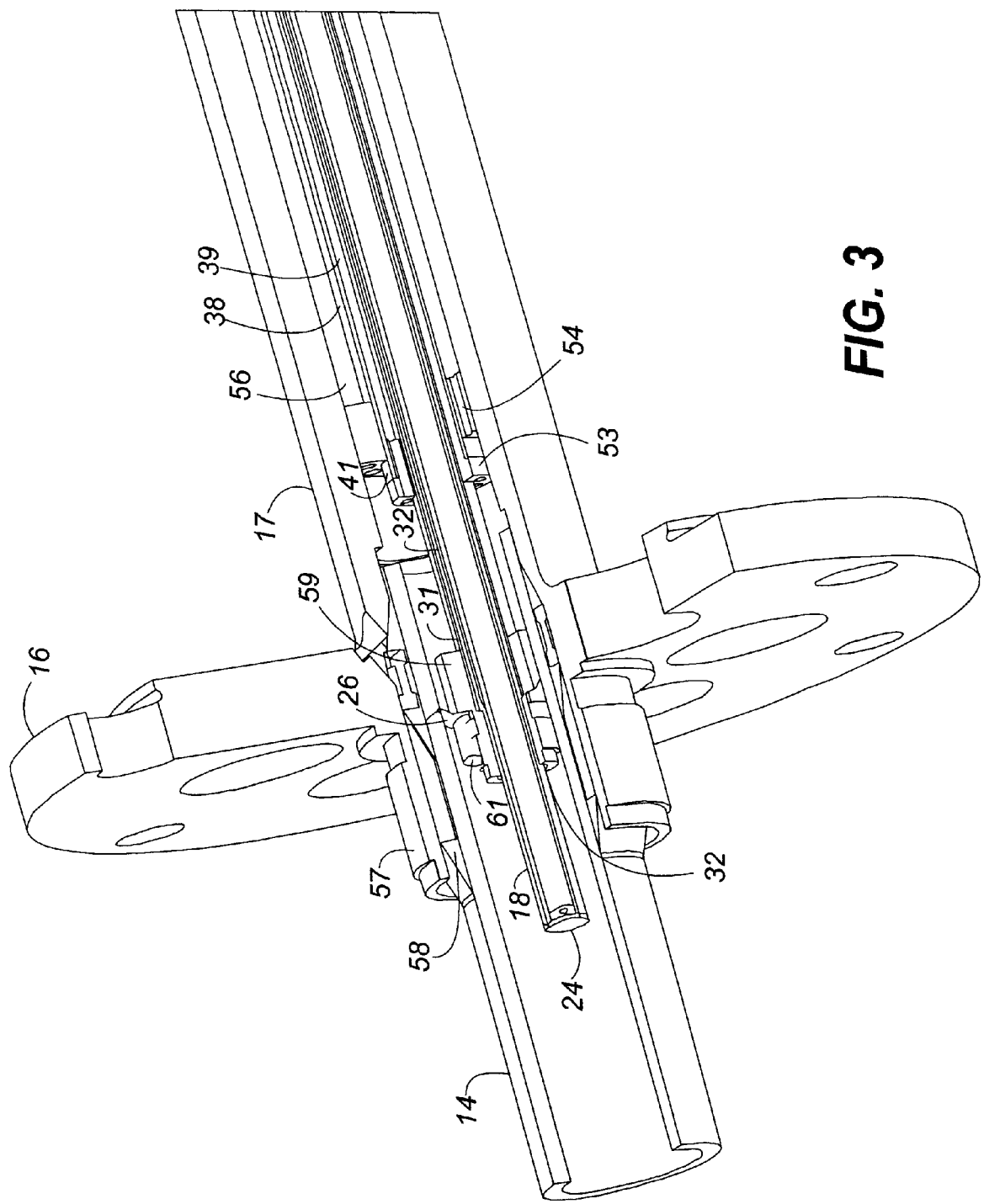
FIG. 3 is an enlarged perspective, partially sectional view of a portion of the apparatus of FIG. 2.

FIG. 3 is a perspective, partially sectional view of that portion of the assembly of FIG. 2 in the area of the gas emission into the starter tube 14. It can be seen that sealing member 26 is mounted on the distal end of tubular member 31 by means of first and second sealing nuts 59 and 61 in a manner similar to that shown in Mueller application Ser. No. 09/383,716. However, the internal diameter of nut 59, as shown, is greater than the diameter of delivery tube 18, thereby creating a passageway connecting first passageway 32 with the interior of starter tube 14. As explained in the Mueller application, the mounting may take any of a number of forms, such as threads, bayonet lock, or other means for securing seal 26 in place. Perforated support member 53 supports second tubular member 38 on first tubular member 31 and, being perforated, permits passage of the buffer gases in passageway 39 therethrough into the region behind seal 26. Perforated support member 54, which is a press fit, preferably, on tubular member 38 also permits passage of the buffer gases into third passageway 56, and also functions as a bearing surface for the rotating shaft 17 of arbor 16 while supporting the end 41 of tubular member 38, and is made of a suitable bearing material, such as Teflon®. Thus, there is a circulation path for the buffer gases.

Figure 4:
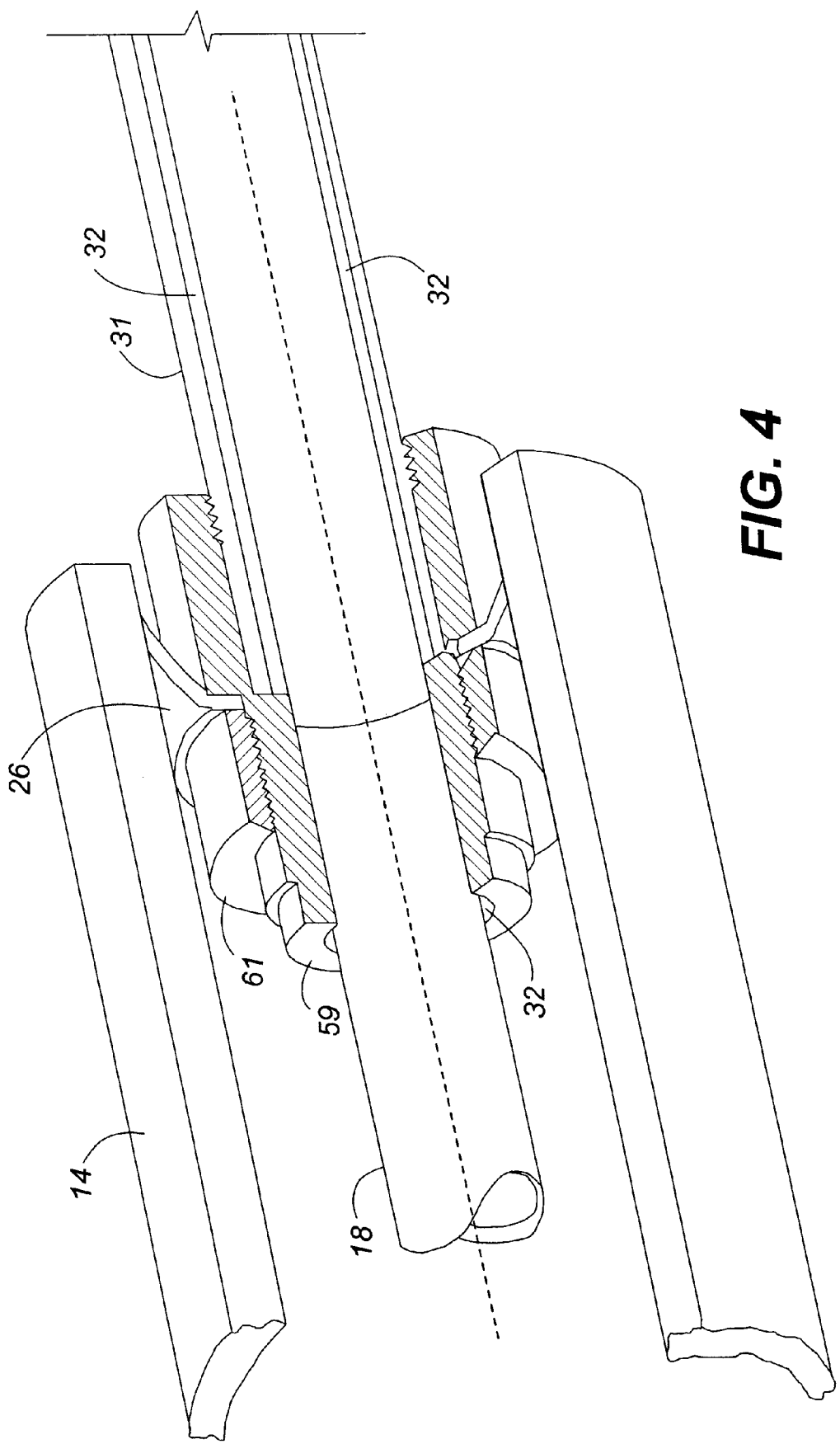
FIG. 4 is an enlarged perspective, partially sectional view of the seal portion of the view in FIG. 3.

FIG. 4 is an enlarged view of the seal mounting arrangement of FIG. 3, showing somewhat more clearly the clearance between nut 59 and delivery tube 18 forming the opening to passage way 32.

Figure 5:
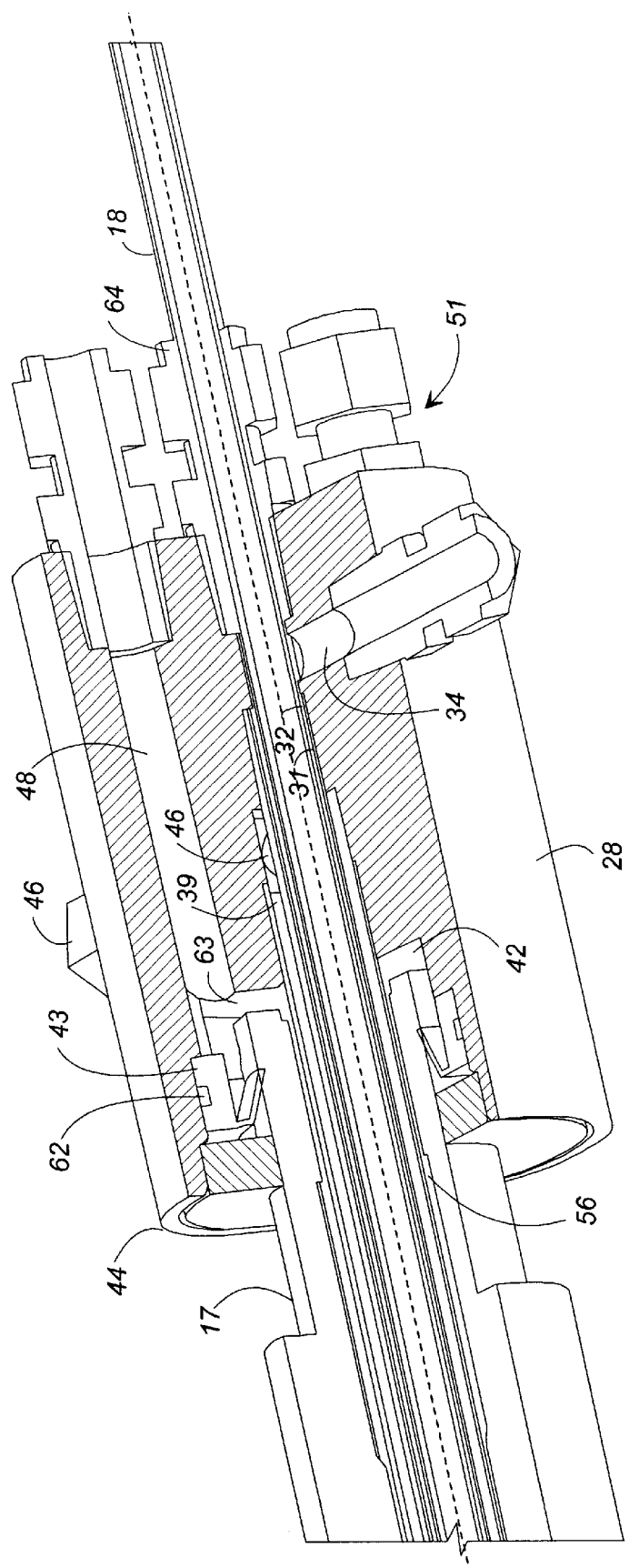
FIG. 5 is an enlarged perspective, partially sectional view of the seal coupling member region of the apparatus of FIG. 2.
Figure 6D:
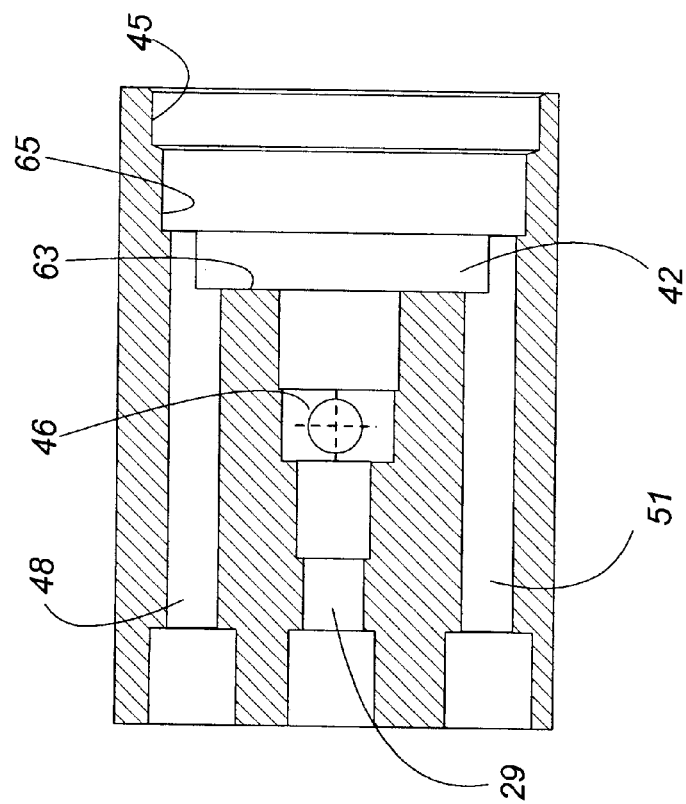
FIG. 6D is a cross-sectional view along the line I—I of FIG. 6B.
Figure 6A:
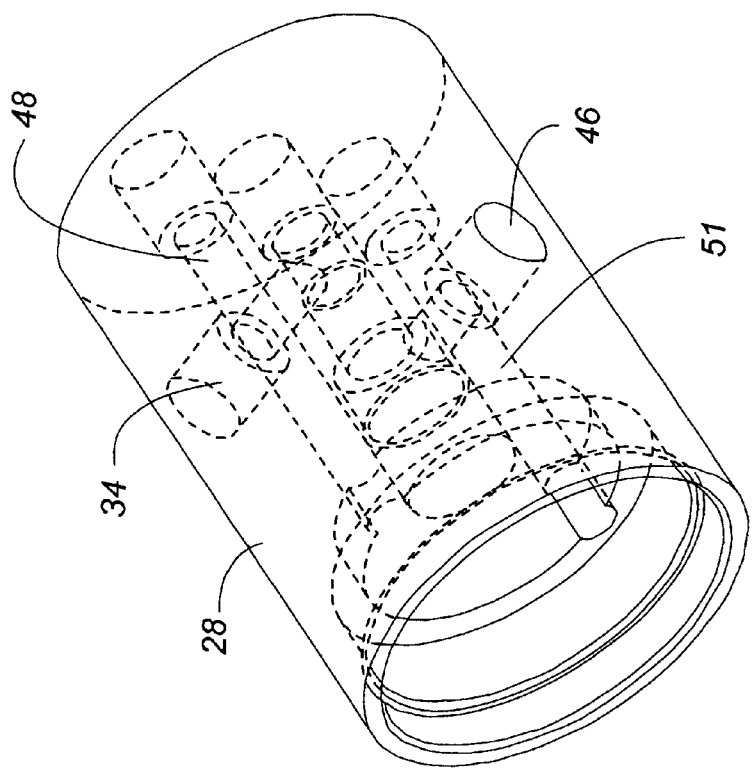
FIG. 6A is a perspective view of the seal coupling member of the present invention.

FIG. 5 is a perspective, partially sectional view of that portion of the arrangement of FIG. 2 that includes the seal coupling member 28. It can be appreciated that retainer member 44, which is a press fit, preferably, in a large diameter bore in member 28, functions as a bearing for rotating arbor shaft 17. As such, it is preferably made of a suitable material such as Teflon®. Immediately behind member 44 is sealing member 43, which is preferably a tight fit in an enlarged bore in member 28, made seal tight by means of an O-ring 62 in groove 66. Sealing member 43 defines, in conjunction with a wall 63, the buffer gas chamber 42 which communicates with the third passageway 56. Bore 46 communicates with the second passageway 39 for introducing buffer gases into the buffer zone as explained hereinbefore, and bore 48 communicates with the buffer chamber 42 for withdrawing gases therefrom. Bore 34 communicates with the first passageway 32 for monitoring the pressure in starter tube 14 as explained hereinbefore. Feeder tube 18 extends through, member 28, as shown, being affixed thereto by a coupling member 64. Alternatively, tube 18 may be coupled in coupling member 64 to a suitable gas supply conduit, not shown. Bore 51 communicates with buffer chamber 42 and, as shown in FIG. 1, is connected with a gauge 52 for monitoring the pressure in the buffer zone. Gauge 52 may also include connection to buffer gas source 47, which communicates through bore 46 with passageway 39, for adjusting the pressure of the buffer gas within the buffer zone in response to gauge 52 readings. Bore 48 is connected to low pressure supply 49 which may also be controlled by gauge 52 and to chamber 42 for flushing chamber 42 and hence the buffer zone. In this way there is a continuous circulation of buffer gases.

FIGS. 6A through 6D are various views of the seal coupling member 28 showing the location and orientation of the bores therein, discussed in the preceding. It can be seen that both bores 48 and 51 communicate with chamber 42, hence their connections, as shown in FIG. 1, may be reversed. On the other hand, bore 34, which communicates with first passageway 32 and bore 46, which communicates with second passageway 39 cannot be reversed.

FIGS. 7A and 7B are plan and elevation views respectively of retainer member 44, which is preferably made of a suitable bearing or bushing material, such as Teflon® in order to function as a biasing surface for the end of arbor shaft 17. Member 44 is preferably a press fit in bore 45 of seal coupling member 28 and is, for example, approximately two inches in diameter. It is to be understood, of course, that this dimension is given merely by way of example, and not as a requirement.

FIG. 8A is an elevation view of seal 43 and FIG. 8B is a cross-section along the line I—I of FIG. 8A. Seal 43 is preferably made of a suitable sealing material, such as Teflon®, and has on its outer periphery an O-ring 62 in groove 66, as shown in FIG. 5. Seal 43 is, with the O-ring 62, a seal fit within bore 65 of member 28 and may have, for example, a diameter of approximately one and seven-eighths inches (1.876").

FIG. 9A is a side elevation view and FIG. 9B is a front elevation view of perforated support member 53. As can be seen, the "perforations" are a plurality of longitudinal holes 67 extending through member 53, and provide a passage for the buffer gases as they pass from the second passageway 39 into the region behind sealing arrangement 26. Holes 67 can be slots in the periphery of member 53 ID or OD. Other ways for forming a passageway may also be used. Member 53 is bored to fit over tubular member 31 and within tubular member 38. Member 53 functions to maintain a proper spacing between the two tubular members 31 and 38, and is preferably made of a suitable plastic or ceramic material. In conformance with dimensions already given, bore 68 may be, for example, approximately three-eighths of an inch (0.375") and its lesser outside diameter 69 approximately seventeen thirty-seconds for an inch (0.56") while its greater outside diameter portion 71 is approximately nine-sixteenths of an inch (0.62"). A shoulder 72 is thus formed to function as a stop for the distal end of tubular member 38.

FIG. 10A is a side elevation view and FIG. 10B is a front elevation view of the second perforated support member 54. The "perforations" are longitudinal holes 73 which afford passage to the buffer gases from the region of the sealing assembly 26 into third passageway 56. Inasmuch as member 54 bears against the interior wall of arbor shaft 17, which is rotating during the manufacturing process, it should be made of a suitable bearing material such as, for example, Teflon®. Member 54 functions to maintain the distal end 41 of tubular member 38 in proper spaced relationship to the interior of arbor shaft 17. As such, it has a bore 74 which is, preferably, a press fit on tubular member 38. Typical dimensions for member 54 are five-eighths of an inch (0.625") for bore 74 and one inch (1.00") for the outside diameter.

During operation of the apparatus of FIG. 1, the chemical vapor pressure within the starter tube is continuously monitored, and corrections made, when necessary, as during tube collapse. At the same time, buffer gas pressure is monitored to insure proper sealing for the different stages of the operation. The seals used are similar to, or in many cases the same as, those shown in the aforementioned Mueller applications.

It can be appreciated from the foregoing that the invention constitutes an economical and efficient retrofit of existing modified vapor deposition apparatus, in order to achieve both the advantage of buffer zone use, and of interior pressure monitoring of the starter tube.

In conclusion, it should be noted that it will be obvious to those skilled in the art that many variations and modifications may be made to the preferred embodiment or embodiments without departure from the principles of the present invention. All such variations and modifications are intended to be included herein as being within the scope of the present invention. Further, in the claims hereafter, the corresponding structure, materials, acts, and equivalents of all means or step plus function elements are intended to include any structure, materials, or acts for performing the functions with other specifically claimed elements.

What is claimed is:

1. For use in a chemical delivery system to a rotatable tubular member having a delivery tube and means for rotating the tubular member which includes a hollow tubular shaft, a sealing apparatus comprising:
    a stationary seal coupling member having a bore therein through which the delivery tube passes;
    a first tubular member surrounding the delivery tube and extending along the length thereof from said seal coupling member to a distal end;
    a sealing member mounted on said distal end;
    said first tubular member forming with said delivery tube a first passageway extending from said sealing member to said coupling member;
    a second tubular member having a distal end surrounding said first tubular member and forming a second passageway extending from the region of the seal member to said coupling member;
    said second tubular member forming with the hollow tubular shaft a third passageway extending from the region of said seal member to a buffer chamber within said coupling member; and
    a seal member for sealing said buffer chamber from the exterior of the apparatus.

2. An apparatus as claimed in claim 1 wherein said sealing member is made of Teflon®.

3. An apparatus as claimed in claim 1 wherein said seal member is made of Teflon®.

4. An apparatus as claimed in claim 1 wherein a first bore within said seal coupling member communicates with said first passageway and is adapted to be connected with external apparatus.

5. An apparatus as claimed in claim 4 wherein said external apparatus includes a pressure gauge for indicating the pressure within the rotating tubular member.

6. An apparatus as claimed in claim 1 wherein a second bore within said seal coupling member communicates with said second passageway and is adapted to be connected with external apparatus.

7. An apparatus as claimed in claim 6 wherein said external apparatus is a buffer gas supply.

8. An apparatus as claimed in claim 1 wherein a third bore within said seal coupling member communicates with said buffer chamber and is adapted to be connected with external apparatus.

9. An apparatus as claimed in claim 8 wherein the external apparatus is a low pressure source.

10. An apparatus as claimed in claim 1 wherein a fourth bore within said seal coupling member communicates with said buffer chamber and is adapted to be connected with external apparatus.

11. An apparatus as claimed in claim 10 wherein said external apparatus is a pressure monitoring arrangement.

12. An apparatus as claimed in claim 1 and further including a first support member for maintaining the distal end of said second tubular member in spaced relationship with said first tubular member.

13. An apparatus as claimed in claim 11 wherein said first support member is a circular support member having passages therethrough.

14. An apparatus as claimed in claim 1 and further including a second support member for maintaining the distal end of said second tubular member in spaced relationship with the hollow tubular shaft.

15. An apparatus as claimed in claim 14 wherein said second support member is a circular member having passages therethrough.

16. An apparatus as claimed in claim 14 wherein said second support member is made of a bearing material.

17. An apparatus as claimed in claim 16 wherein said bearing material is Teflon®.

18. A sealing system for a gas delivery system for delivering gas to a rotating tubular member contained within an arbor shaving a tubular shaft, said sealing system comprising:
    a stationary seal coupling member having an axial bore therein for receiving a gas delivery tube which extends to and within the rotating tubular member;
    first means extending from said coupling member forming a first channel for passage of gases from within the rotating tubular member to said coupling member;
    second means extending from said coupling member forming a second channel for passage of buffer gases from said coupling member to a buffer zone region;
    a sealing member for sealing said first means within said rotating tubular member, said buffer zone region being located on the coupling side of said sealing member;
    said second means forming, in conjunction with the tubular shaft, a third passageway extending from said buffer zone region to a chamber within said coupling member.

19. A sealing system as claimed in claim 18 wherein said first channel communicates with a first bore in said sealing coupling member.

20. A sealing system as claimed in claim 19 wherein said first bore is connected to a pressure monitoring arrangement.

21. A sealing system as claimed in claim 18 wherein said second channel communicates with a second bore in said seal coupling member.

22. A sealing system as claimed in claim 21 wherein said second bore is connected to a buffer gas supply.

23. A sealing system as claimed in claim 18 wherein said third channel communicates with a buffer gas chamber in said seal coupling member.

24. A sealing system as claimed in claim 23 wherein said buffer gas chamber is connected to a low pressure source.

25. A sealing arrangement as claimed in claim 23 wherein said buffer gas chamber is connected to a pressure monitoring arrangement.

* * * * *